US011075882B2

(12) United States Patent
Barda

(10) Patent No.: US 11,075,882 B2
(45) Date of Patent: Jul. 27, 2021

(54) METHOD AND SYSTEM FOR REDUCING FALSE POSITIVES IN WEB APPLICATION FIREWALLS

(71) Applicant: CHECKPOINT SOFTWARE TECHNOLOGIES LTD., Tel Aviv (IL)

(72) Inventor: Roy Barda, Nes Ziona (IL)

(73) Assignee: CHECK POINT SOFTWARE TECHNOLOGIES LTD., Tel Aviv (IL)

(*) Notice: Subject to any disclaimer, the term of this patent is extended or adjusted under 35 U.S.C. 154(b) by 388 days.

(21) Appl. No.: 16/288,171

(22) Filed: Feb. 28, 2019

(65) Prior Publication Data

US 2020/0280538 A1 Sep. 3, 2020

(51) Int. Cl.
*H04L 29/06* (2006.01)
*H04L 29/08* (2006.01)

(52) U.S. Cl.
CPC ...... *H04L 63/0263* (2013.01); *H04L 63/0281* (2013.01); *H04L 67/02* (2013.01); *H04L 63/1425* (2013.01)

(58) Field of Classification Search
CPC . H04L 63/0263; H04L 63/0281; H04L 67/02; H04L 63/1425
See application file for complete search history.

(56) References Cited

U.S. PATENT DOCUMENTS

| 9,323,936 B2* | 4/2016 | Quong | G06F 21/51 |
| 9,471,533 B1* | 10/2016 | Roth | G06F 15/167 |
| 2019/0303601 A1* | 10/2019 | Newman | G06F 21/62 |

* cited by examiner

*Primary Examiner* — Arvin Eskandarnia
(74) *Attorney, Agent, or Firm* — Mark M. Friedman

(57) ABSTRACT

Computerized methods and systems reduce the false positive rate of Web Application Firewalls (WAFs), by operating automatically and utilizing system defined "trusted sources".

20 Claims, 14 Drawing Sheets

WHITE LIST 215d

TRUSTED SOURCES REQUESTS 215e

| Normalized Data | Feature | Source |
|---|---|---|
| http://SQLInjection.example.com/post-comment/index.html?user_id | SELECT | User1 |
| http://SQLInjection.example.com/post-comment/index.html?user_id | * | User1 |
| http://SQLInjection.example.com/post-comment/index.html?user_id | FROM | User1 |

FIG. 2B-1

WHITE LIST 215d

TRUSTED SOURCES REQUESTS 215e

| Normalized Data | Feature | Source |
|---|---|---|
| http://SQLInjection.example.com/post-comment/index.html?user_id | SELECT | User1, User2 |
| http://SQLInjection.example.com/post-comment/index.html?user_id | * | User1, User2 |
| http://SQLInjection.example.com/post-comment/index.html?user_id | FROM | User1, User2 |
| http://SQLInjection.example.com/post-comment/index.html?user_id | WHERE | User2 |

FIG. 2B-2

WHITE LIST 215d

Normalized Data | Feature
--- | ---
http://SQLInjection.example.com/post-comment/index.html?user_id | SELECT
http://SQLInjection.example.com/post-comment/index.html?user_id | *
http://SQLInjection.example.com/post-comment/index.html?user_id | FROM

TRUSTED SOURCES REQUESTS 215e

Normalized Data | Feature | Source | Thr
--- | --- | --- | ---
http://SQLInjection.example.com/post-comment/index.html?user_id | WHERE | User2 | 2

FIG. 2B-3

WHITE LIST 215d

TRUSTED SOURCES REQUESTS 215e

Normalized Data http://SQLInjection.example.com/post-comment/index.html?user_id

| Feature | Source |
|---|---|
| SQLINJECTION | User1 |

FIG. 2C-1

WHITE LIST 215d

TRUSTED SOURCES REQUESTS 215e

Normalized Data | Feature | Source
http://SQLInjection.example.com/post-comment/index.html?user_id | SQLINJECTION | User1, User2

FIG. 2C-2

METHOD AND SYSTEM FOR REDUCING FALSE POSITIVES IN WEB APPLICATION FIREWALLS

TECHNICAL FIELD

The present invention is directed to traffic administration through web application firewalls, and particularly to minimizing alerts on HTTP (Hypertext Transfer Protocol) traffic passing through the web application firewalls.

BACKGROUND OF THE INVENTION

A major problem with contemporary web application firewalls is that they generate a large number of unnecessary alerts on valid HTTP (Hypertext Transfer Protocol) traffic. This becomes an unmanageable solution for information technology professionals, who must create customized exceptions for truly legitimate traffic which caused an alert. The amount of time to create these customized exceptions is essentially never ending.

Various Web Application Firewall (WAF) vendors have attempted to solve this problem by using different machine learning algorithms. In one machine learning algorithm, the administrator defines a learning period in which the firewall's policy is being learned based on the traffic. Some firewalls will automatically whitelist traffic during this period, while other firewalls prompt the Information Technology (IT) administrator on how to handle the traffic.

Algorithms that automatically whitelist traffic exhibit several drawbacks. Initially, the firewall must be completely sure that the traffic is legitimate. Most of the time, this is not the case. This is because an IT administrator cannot be completely sure that the traffic considered during the learning period is legitimate. However, the alternate approach, asking the IT administrator to whitelist traffic, is burdensome, as it has the potential to be a never-ending process.

SUMMARY OF THE INVENTION

The present invention provides computerized methods and systems for reducing the false positive rate of WAFs. The methods and systems operate automatically and utilize "trusted sources" as defined by the system administrators, other administrative or controlling personnel, or machines, for each system. "Trusted sources" are those that in most cases generate legitimate traffic. Such sources can be identified by specific Internet Protocol (IP)/Headers or even a combination of security notions. For example, the sources may be all sources that have an anti-malware solution installed, without identified malwares in the last three months. Moreover, to reduce the risk that a specific trusted source generates illegitimate traffic, the invention automatically whitelists traffic that came from multiple trusted sources. This type of baselining/whitelisting can be done on traffic throughout the web application lifetime without administrator intervention, producing a lower false-positive rate.

The present invention provides computerized automated processes which minimize, if not eliminate, the need for human intervention, as exceptions no longer need to be manually defined. The process is also more accurate in analyzing traffic between a gateway, that incorporates a Web Application and Application Programming Interface (API) Protection (WAAP) engine, and a web application (e.g., web site), as human error, resulting from human intervention is eliminated.

Embodiments of the invention are directed to a method for analyzing electronic and/or data traffic. The method comprises: obtaining (e.g., deriving) at least one feature from normalized data associated with the traffic; determining whether the at least one feature has been whitelisted; determining whether the normalized data was from a trusted source; if the at least one feature was not included on a white list, and the normalized data, from which the at least one feature was obtained, was from a trusted source: determining whether the at least one feature was obtained from a predetermined amount of trusted sources, and similar normalized data; and, if the predetermined number of trusted sources has been met: 1) updating the whitelist to include the features which have met the predetermined number of trusted sources, and 2) indicating that the traffic, including the features from a subsequent and similar normalized data, is allowed to pass to the destination associated with the normalized data.

Optionally, the method is such that the at least one feature includes one or more features.

Optionally, the method is such that the features are suspicious features in accordance with predetermined criteria.

Optionally, the method is such that the predetermined criteria include rules and policies.

Optionally, the method additionally comprises: responding to the indicating that the traffic, including the features from a subsequent and similar normalized data, is allowed to pass to the destination associated with the normalized data, by sending a message that the traffic is allowed to pass to the destination associated with the normalized data to a gateway.

Optionally, the method is such that the gateway includes at least one of: a network gateway, a proxy, a client, a server associated with an intended destination for the traffic.

Optionally, the method is such that the predetermined number includes a threshold number.

Optionally, the method is such that the similar normalized data includes identical normalized data.

Optionally, the method is such that the normalized data includes at least one request.

Optionally, the method is such that the at least one request includes an HTTP (Hypertext Transfer Protocol) request.

Optionally, the method additionally comprises: normalizing data associated with the traffic to create the normalized data associated with the traffic.

Embodiments of the invention are directed to a computer system for analyzing electronic and/or data traffic. The computer system comprises: a non-transitory storage medium for storing computer components; and, a computerized processor for executing the computer components. The computer components comprise: a module for obtaining at least one feature from normalized data associated with the traffic; a module for determining whether the at least one feature has been whitelisted; a module for determining whether the normalized data was from a trusted source; a module for determining that if the at least one feature was not included on a white list, and the normalized data, from which the at least one feature was obtained, was from a trusted source, determining whether the at least one feature was obtained from a predetermined amount of trusted sources, and similar normalized data; and, a module for determining that when the predetermined number of trusted sources has been met: 1) updating the whitelist to include the features which have met the predetermined number of trusted sources, and 2) indicating that the traffic, including the features from a subsequent and similar normalized data, is allowed to pass to the destination associated with the normalized data.

Optionally, the computer system is such that the at least one feature includes one or more features.

Optionally, the computer system additionally comprises a module for designating the one or more features as suspicious features.

Optionally, the computer system additionally comprises: a module for responding to the indicating that the traffic, including the features from a subsequent and similar normalized data, is allowed to pass to the destination associated with the normalized data, by sending a message that the traffic is allowed to pass to the destination associated with the normalized data to a gateway.

Optionally, the computer system additionally comprises a gateway including at least one of: a network gateway, a proxy, a client, a server associated with an intended destination for the traffic.

Embodiments of the invention are directed to a computer usable non-transitory storage medium having a computer program embodied thereon for causing a suitably programmed system to analyze electronic and/or data traffic, by performing the following steps when such program is executed on the system. The steps comprise: obtaining at least one feature from normalized data associated with the traffic; determining whether the at least one feature has been whitelisted; determining whether the normalized data was from a trusted source; if the at least one feature was not included on a white list, and the normalized data, from which the at least one feature was obtained, was from a trusted source: determining whether the at least one feature was obtained from a predetermined amount of trusted sources, and similar normalized data; and, if the predetermined number of trusted sources has been met: 1) updating the whitelist to include the features which have met the predetermined number of trusted sources, and 2) indicating that the traffic, including the features from a subsequent and similar normalized data, is allowed to pass to the destination associated with the normalized data.

Optionally, the computer usable non-transitory storage medium is such that the at least one feature includes one or more features, and the one or more features include suspicious features in accordance with predetermined criteria including rules and policies.

This document references terms that are used consistently or interchangeably herein. These terms, including variations thereof, are as follows:

A "computer" includes machines, computers and computing or computer systems (for example, physically separate locations or devices), servers, computer and computerized devices, processors, processing systems, computing cores (for example, shared devices), and similar systems, workstations, modules and combinations of the aforementioned. The aforementioned "computer" may be in various types, such as a personal computer (e.g., laptop, desktop, tablet computer), or any type of computing device, including mobile devices that can be readily transported from one location to another location (e.g., smartphone, personal digital assistant (PDA), mobile telephone or cellular telephone).

A "server" is typically a remote computer or remote computer system, or computer program therein, in accordance with the "computer" defined above, that is accessible over a communications medium, such as a communications network or other computer network, including the Internet. A "server" provides services to, or performs functions for, other computer programs (and their users), in the same or other computers. A server may also include a virtual machine, a software based emulation of a computer.

An "application", includes executable software, and optionally, any graphical user interfaces (GUI), through which certain functionality may be implemented.

A "client" is an application that runs on a computer, workstation or the like and relies on a server to perform some of its operations or functionality.

HTTP (Hypertext Transfer Protocol) is an application protocol for distributed, collaborative, hypermedia information systems. Hypertext is structured text that uses logical links (hyperlinks) between nodes containing text. HTTP is the protocol to exchange or transfer hypertext.

URL (Uniform Resource Locator) is a reference to a resource that specifies the location of the resource on a computer network and a mechanism for retrieving it, such as an address of a specific Web site or file on the Internet.

Unless otherwise defined herein, all technical and/or scientific terms used herein have the same meaning as commonly understood by one of ordinary skill in the art to which the invention pertains. Although methods and materials similar or equivalent to those described herein may be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the present invention are herein described, by way of example only, with reference to the accompanying drawings. With specific reference to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

Attention is now directed to the drawings, where like reference numerals or characters indicate corresponding or like components. In the drawings:

FIGS. 2B-1, 2B-2 and 2B-3 are diagrams of the data storage, the Trusted Sources Requests storage and the White List storage at different times based on one configuration;

FIGS. 2C-1, 2C-2 and 2C-3 are diagrams of the data storage, the Trusted Sources Requests storage and the White List storage at different times based on another configuration;

FIG. 3 is a flow diagram of a process in accordance with embodiments of the invention; and, FIGS. 4A-1, 4A-2, 4B, 4C, and 4D are screen diagram of posts, which are included in data associated with traffic, which are used in explaining the process of FIG. 3.

DETAILED DESCRIPTION OF THE DRAWINGS

Figure 1:
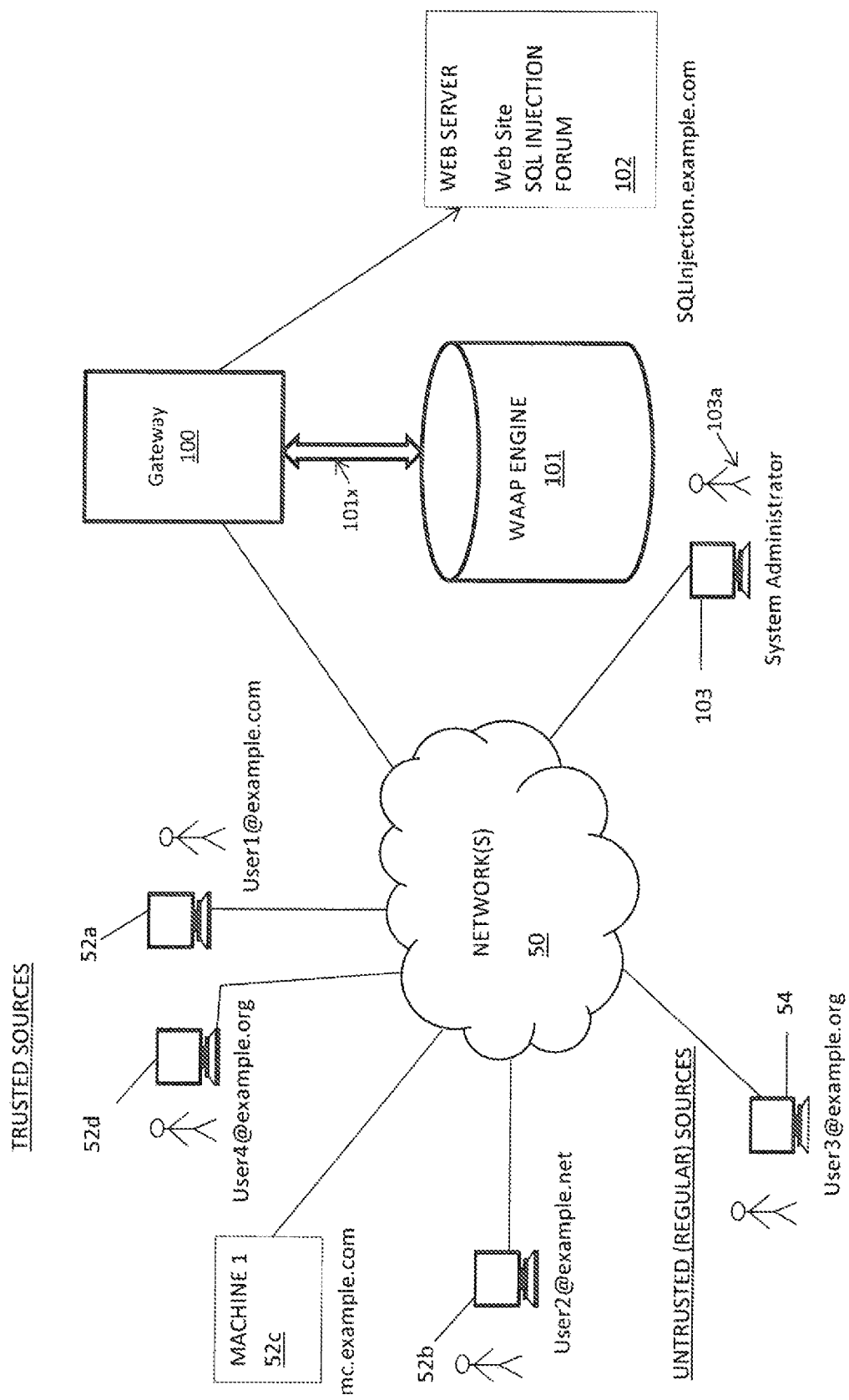
FIG. 1 is a diagram of an exemplary environment for the system in which embodiments of the disclosed subject matter are performed.

Before explaining at least one embodiment of the invention in detail, it is to be understood that the invention is not necessarily limited in its application to the details of construction and the arrangement of the components and/or methods set forth in the following description and/or illustrated in the drawings. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more non-transitory computer readable (storage) medium(s) having computer readable program code embodied thereon.

Throughout this document, numerous textual and graphical references are made to trademarks, and domain names. These trademarks and domain names are the property of their respective owners, and are referenced only for explanation purposes herein.

The present invention, in some embodiments, is directed to a Web Application and Application Programming Interface (API) Protection engine (WAAP engine), with functions including that of a network inspection device, commonly known as a "firewall," which is a network security system, either hardware-based and/or software-based, that controls incoming and outgoing network traffic based on a set of rules. The firewall serves as a gateway between an external network and an internal, for example, an enterprise network, to which client computers are linked. In the present invention, the network inspection device or firewall, for example, includes operations as a Web Application Firewall (WAF), which serves to block attacks on web applications, and, for example, protects both web sites and web application program interfaces (APIs).

Reference is now made to FIG. 1, which shows an exemplary operating environment, including an external network(s) 50, to which is linked trusted sources, for example, the computer 52a of User1 (User1@example.com), the computer 52b of User2 (User2@example.net), a machine 52c (mc.example.com), for example, a computer, the computer 52d of User4 (User4@example.org), and untrusted sources, such as the computer 54 of User3 (User3@example.org). A gateway 100, which links to a Web Application and Application Programming Interface (API) Protection (WAAP) engine 101 and a web server 102, is also linked to the network(s) 50. The web server 102 hosts the web site, "SQL Injection Forum", with the URL SQLInjection.example.com.

The WAAP engine 101 receives, from the gateway 100, data associated with the traffic, the traffic (from a source 52a-52d and 54), received at the gateway 100, over the network(s) 50. This received data associated with the traffic includes, for example, a request transmitted (sent) from the source, and extractable features from the request, including, for example, features from the actual message, transmitted by the source, to be posted, for example, at the web site of the web server 102. The WAAP engine 101, analyzes the received data and recommends whether the traffic is allowable to pass to its intended destination, This recommendation is transmitted from the WAAP engine 101 to the gateway 100, which ultimately allows or disallows, e.g., including blocking, the traffic from passing to its intended destination, e.g., the web server 102.

"Traffic" as used herein includes electronic and/or data communications (e.g., electronic and/or data traffic), including packetized communications. The request included in the traffic, and accordingly, the data associated with the traffic, which is received from the gateway 100 by the WAAP engine 101, is, for example, one or more HTTP requests, including HTTP Post requests, and other versions of HTTP requests, as well as Transmission Control Protocol (TCP) and Domain Name Server (DNS) requests. The network 50 may be formed of one or more networks, including for example, the Internet, cellular networks, wide area, public, and local networks. The external network 50 is, for example, a communications network, such as a Local Area Network (LAN) or a Wide Area Network (WAN), including public networks such as the Internet. As shown in FIG. 1, the external network 50 is, for example, the Internet.

The gateway 100 is, for example, a server or a machine for receiving and transmitting traffic over the network 50. The gateway 100 is, for example, a network gateway, a proxy, an actual client (e.g., a user machine, computer, or device), or a server (e.g., the web server 102 itself), which provides data associated with the received traffic to the WAAP engine 101. The WAAP engine 101 may be integral with the gateway 100, or separate from the gateway 100, and linked thereto, as shown in FIG. 1 by the double headed arrow 101x.

The WAAP engine 101 analyzes data associated with the traffic, as received from the gateway 100, and provides an indication as to whether the traffic is allowed to pass to its intended destination (i.e., the web site hosted by the web server 102), for example, in the form of a recommendation to the gateway 100. The recommendation provides data as a message as to whether the traffic is allowable for passage to the intended destination. The WAAP engine 101 may be, for example, administered by a system administrator 103a, via a computer 103 (used interchangeably with the system administrator), for example, linked to the network(s) 50. The system administrator 103a (and computer 103) is representative of any party, person or machine, which can input into the WAAP engine 101 Rules and Policies, and other data, code, and the like, to control the WAAP engine 101.

The external network 50, although shown as a single network, may be a combination of networks and/or multiple networks including, for example, cellular networks. "Linked" as used herein, includes both wired or wireless links, either direct or indirect, such that the computers, including, servers, components and the like, are in electronic and/or data communications with each other.

Figure 2A:
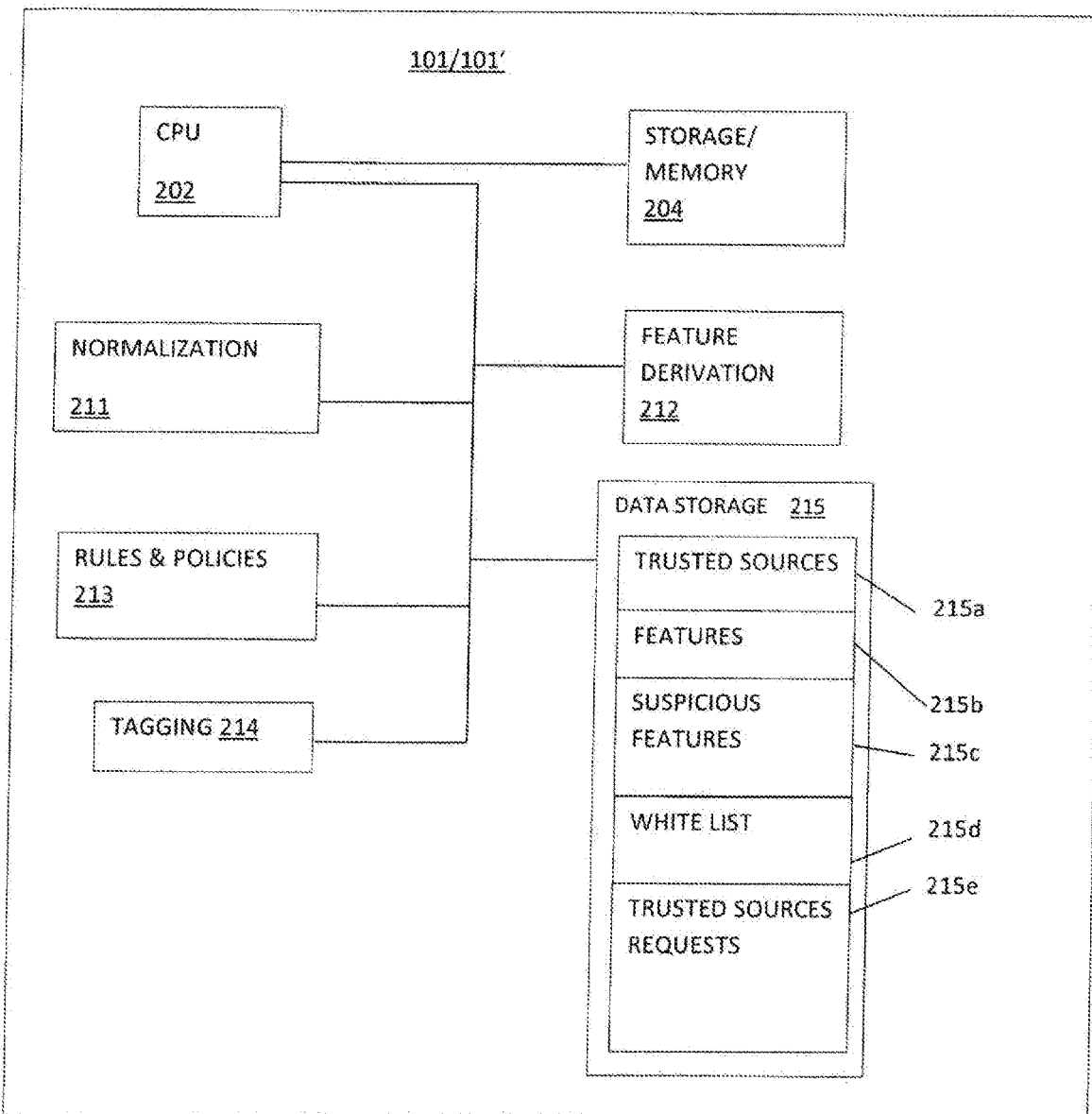
FIG. 2A is a diagram of an example architecture of the WAAP engine of FIG. 1.

Turning also to FIG. 2A, the WAAP engine 101 includes a system 101'. The system 101' includes processors (e.g., a Central Processing Unit (CPU) 202), linked to storage/memory 204.

There are also modules and storage media 211-215, which operate in conjunction with the CPU 202 and storage/memory 204 to perform the present invention. For example, the processors may include x86 Processors from AMD and Intel, Xenon® and Pentium® processors from Intel, as well as any combinations thereof. Additional processors, including hardware processors, storage/memory, modules and storage media may also be part of the system for performing the invention.

Figures 2, 2C, 3:
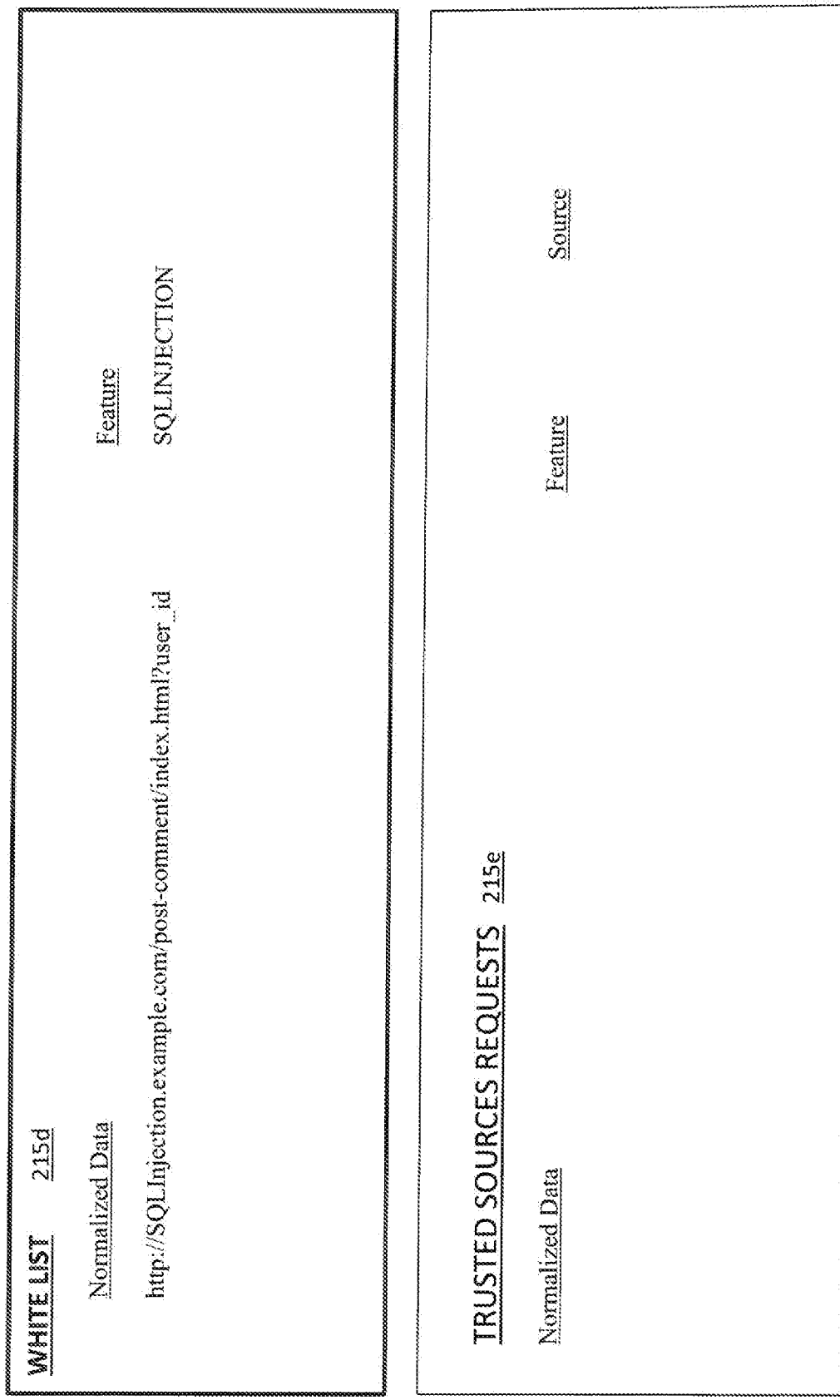
Figure 3:
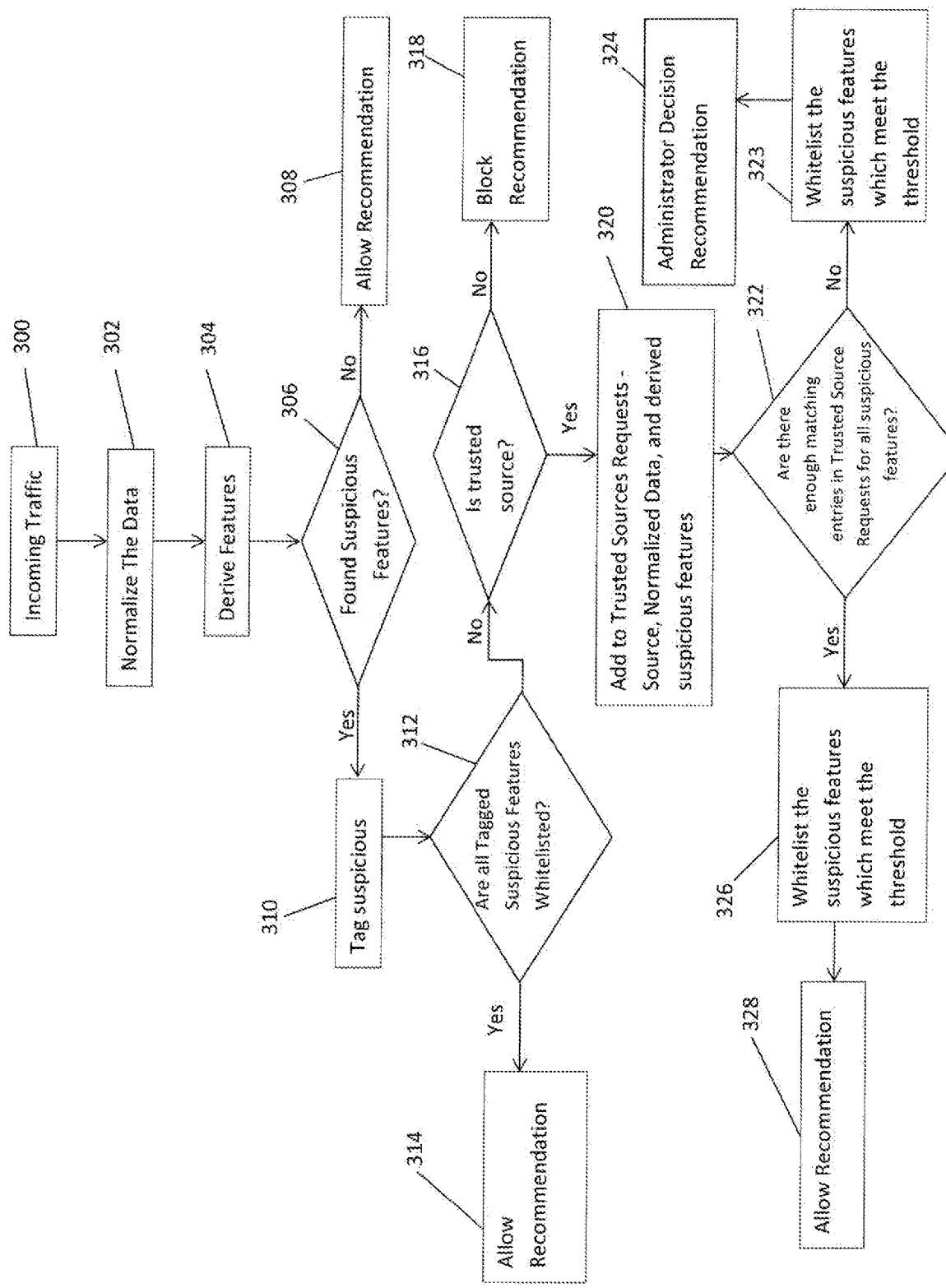

The storage/memory 204 stores machine-executable instructions executed by the CPU 202 for performing the processes of the invention, for example, those detailed in FIG. 3, which when programmed accordingly into the CPU 202, control the WAAP engine 101. There may also be additional servers associated with the WAAP engine 101.

The storage/memory 204, for example, also provides temporary storage for the system 101' and the data storage 215.

The normalization module 211 serves to normalize the data associated with the traffic by, for example, removing all variables related to the user from the data.

Figures 1, 4A:
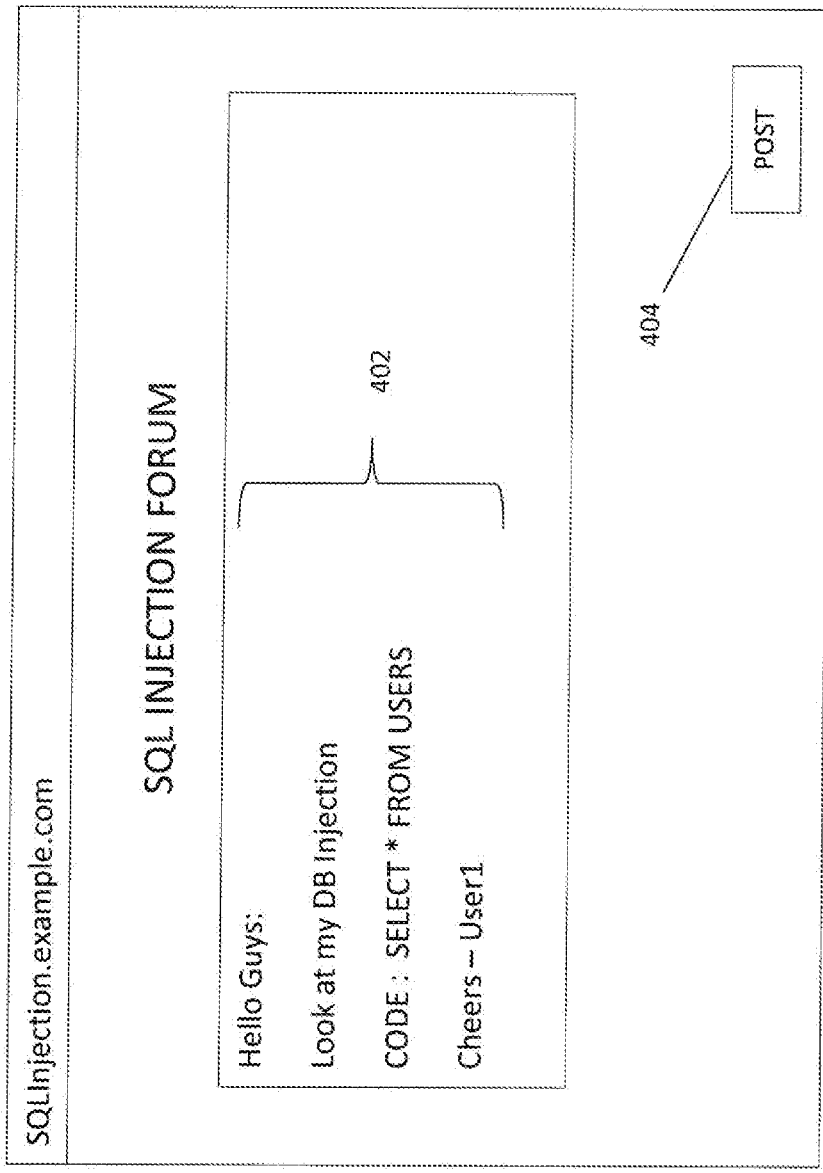
Figures 2, 4A:
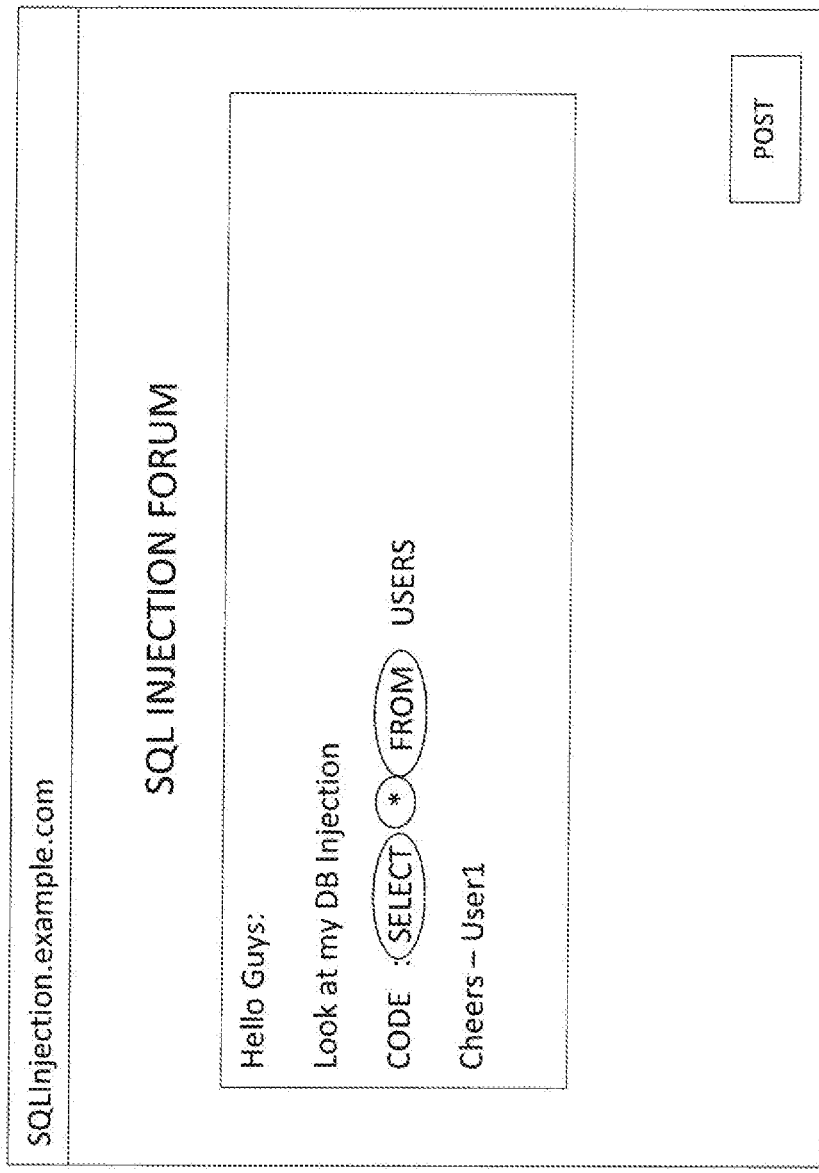
Figure 4B:
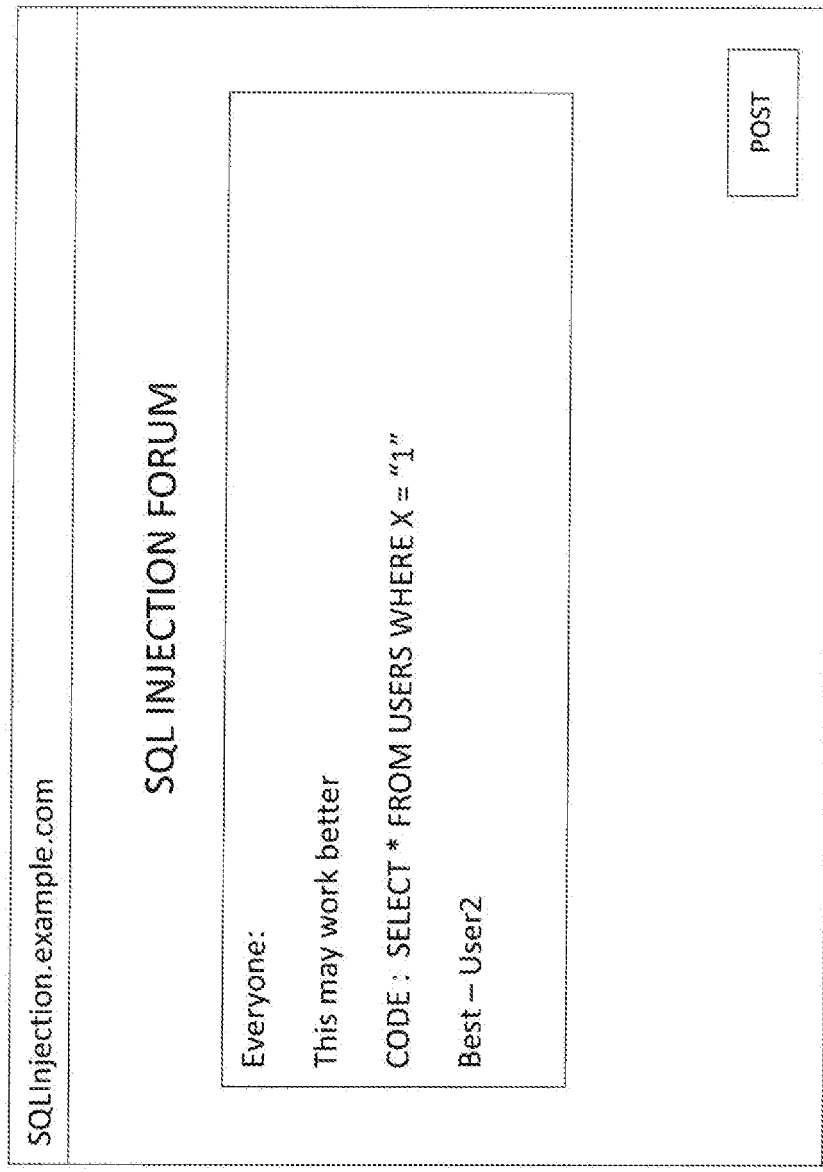
Figure 4C:
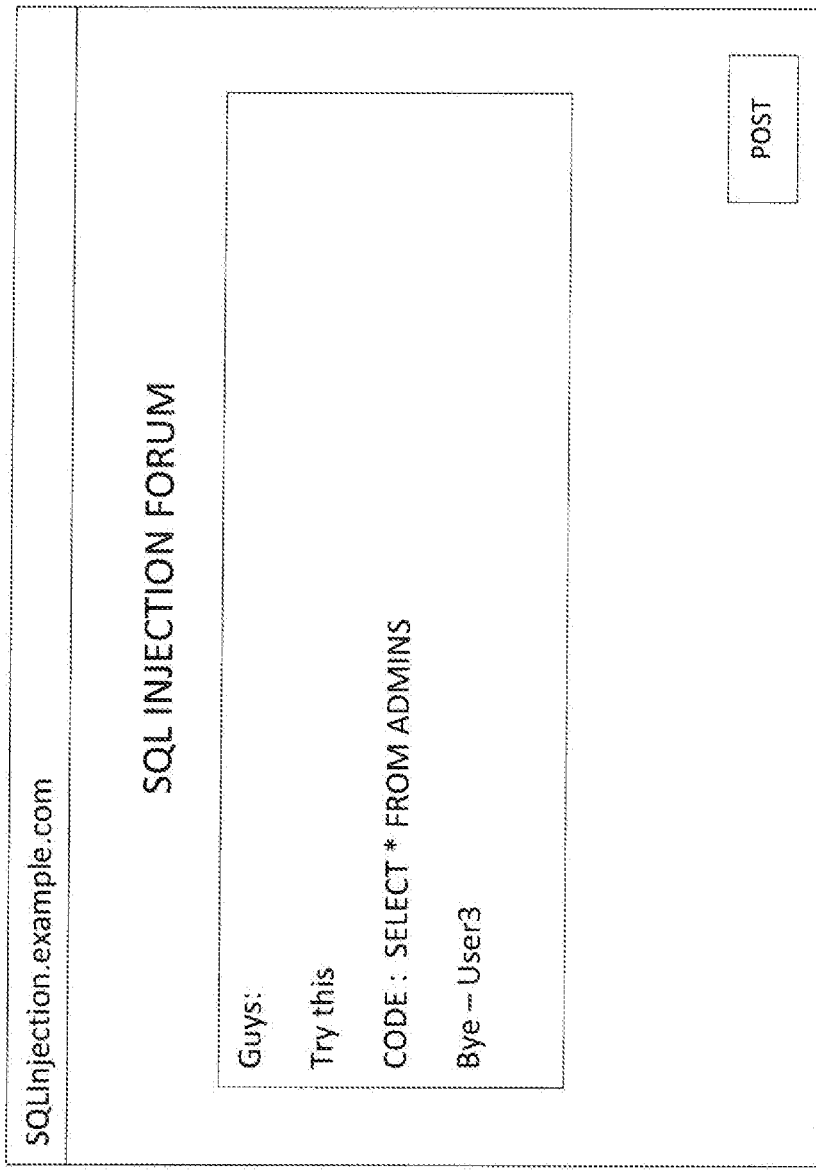
Figure 4D:
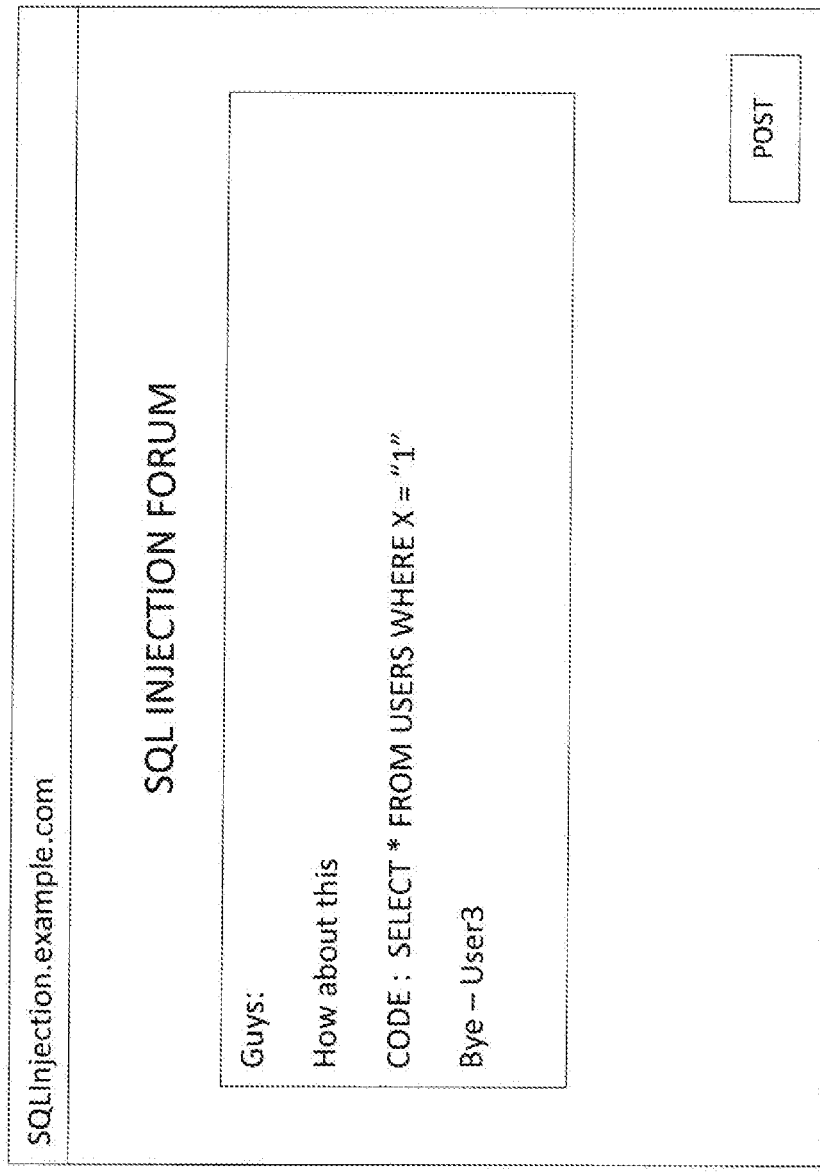

For example, the normalization module 211 receives the following URL for the request in data associated with traffic, having been sent from User1 (computer 52a):

http://SQLInjection.example. com/22012019/post-comment/index.html?user_id=user1 and normalizes this URL data to normalized data of:
http://SQLInjection.example.com/post-comment/index.html?user_id The feature derivation module 212 derives or otherwise obtains features, for example, keywords, terms, phrases, from the data associated with the traffic (e.g., sent from the gateway 100 to the WAAP engine 101). This module 212 also creates features based on the extracted keywords, terms, phrases, from the data associated with the traffic. The features which will be used in the data storage 215e for Trusted Sources Requests and ultimately white lists of the data storage 215d is based on the configurations in the Features data storage 215b and Suspicious Features data storage 215c. These feature configurations of data storage 215b and 215c define how to derive the features, for example, by extraction or creation, with extracted or created features used to populate the Trusted Sources Requests data storage 215e and whitelist data storage 215d. For example, from FIGS. 4A-1 and 4A-2, the extracted features are SELECT, *, FROM. A created feature, as determined by the module 212, via computer programs, rules and policies and the like, is, for example, SQLINJECTION. For example, based on configurations for Features in data storage 215b and configurations for Suspicious Features in data storage 215c, the corresponding data stores for extracted features in Trusted Sources Requests/White Lists are shown in FIGS. 2B-1 to 2B-3, and for created feature configurations for in the Trusted Sources Requests/White Lists are shown in FIGS. 2C-1 to 2C-3.

The Rules and Policies module 213 stores, receives (for example, via the network 50), and applies rules and policies, to determine, for example, whether keywords, terms, phrases and the like in the data associated with the traffic are suspicious. This module 213 also provides rules and policies to define a trusted source, and when to add or remove a trusted source from the list of trusted sources in the data storage 215a, as well as rules and policies to determine the number of trusted sources needed to whitelist, features of for specific normalized data, and the like.

The tagging module 214 tags derived or otherwise obtained features of the data associated with the traffic as indicated to be suspicious (based on the Rules and Policies having been applied thereto), and, for example, stores it in the temporary storage of storage/memory 204.

The data storage 215 includes non-transitory storage media for storing data such as Trusted Sources 215a, Features 215b, Suspicious Features 215c, White Lists 215d, and Trusted Sources Requests 215e.

A list of trusted sources is stored in the data storage 215a, with details about each trusted source. While there are numerous criteria for a trusted source including those defined by Rules and Policies (of module 213), additional criteria may be that the trusted source uses various malware detection software and the like. Also, as per rules and policies and the like, trusted sources may change over time, with non-trusted sources becoming trusted sources and vice versa.

The Features data storage 215b and Suspicious Features data storage 215c store configurations to determine the type of features to be derived, for example, extracted, or created features, as detailed above. The Features and suspicious features are derived in accordance with the configurations in the respective data storage 215b, 215c, with the derived features stored in the Trusted Sources Requests data storage 215e, and when acceptable, whitelisted, the white lists stored in the data storage 215d.

The White Lists 215d and their association with the Trusted Sources Requests 215e are shown in detail in FIGS. 2B-1 to 2B-3, and FIGS. 2C-1 to 2C-3, at various times (the difference between FIGS. 2B-1 to 2B-3, and FIGS. 2C-1 to 2C-3 is the configuration—FIGS. 2B-1 to 2B-3 for extracted features and FIGS. 2C-1 to 2C-3 for created features). For example, the Trusted Sources Requests data storage 215e includes, the normalized data, the features obtained from the normalized data, and, the source of the normalized data.

Attention is now directed to FIG. 3, which shows a flow diagram detailing a computer-implemented process in accordance with embodiments of the disclosed subject matter. Reference is also made to elements shown in FIGS. 1, 2A, 2B-1 to 2B-3, and 2C-1 to 2C-3. The process and subprocesses of FIG. 3 are computerized processes performed by the gateway 100 and the WAAP engine 101. The aforementioned processes and sub-processes can be, for example, performed automatically, and, for example, in real time.

Initially, the process begins at block 300, as incoming traffic, for example, from any of the sources, User1 (via his computer 52a), User2 (via his computer 52b), Machine1 52c, User4 (via his computer 52d), or User3 (via his computer 54) attempts to access the web site/web page hosted by web server 102, whereby the traffic is received by the gateway 100, which passes data associated with the received traffic to the WAAP engine 101. Here, User1, User2, machine1 and User4 and/or their computers 52a, 52b, 52c, 52d are trusted sources, while User3 or his computer 54 is a regular or untrusted source. For example, User1, User2 or User3 posts a comment in the SQL INJECTION FORUM (URL SQLinjection.example.com), by sending a request, for example, an HTTP request, to the web site, of the URL SQLInjection.example.com, hosted by the web server 102. For example in FIG. 4A-1, the comment 402 ("Hello Guys: Look at my DB Injection, CODE: SELECT*FROM USERS") is posted on the SQL Injection Forum at SQLInjection.example.com, and is sent to the intended destination, the web site SQLInjection.example.com, which is hosted by the web server 102, when a user clicks on or otherwise activates, the POST button 404. The gateway 100 receives the sent post (i.e., traffic including a request), and sends data associated with the traffic (e.g., including data associated with the request and the post), to the WAAP engine 101.

The WAAP engine 101, via the normalization module 211, normalizes the data associated with the traffic. Alternately, the WAAP engine 101 receives an already normalized data associated with the traffic, from the gateway 100. The normalization of the data associated with the traffic, in particular the URL of this data, for example, involves removing all variables related to the user associated with the traffic, from the URL of the traffic, at block 302. For example, traffic coming from the computer 52a of User1, for example, an HTTP request, intended for the web site 102, appears to the gateway 100 as:

http://SQLInjection.example.com/22012019/post-comment/index.html?user_id=user1

The data associated with the traffic including data representative of the aforementioned HTTP request is sent to the WAAP engine 101, where the normalization module 211 normalizes the data associated with this traffic to:

http://SQLInjection.example.com/post-comment/index.html?user_id

By normalizing data, the system 101' can determine whether the HTTP normalized data is similar to other normalized data associated with other requests from other traffic data, which is being sent from other sources.

The process moves to block 304, where features, for example, indicators, keywords, terms, and the like, are obtained by being derived from the normalized data associated with the traffic, by being extracted from the normalized data itself, or created, based on the configurations stored in the Features 215b and Suspicious Features 215c data storages. For example, the normalized data includes the URL (SQLinjection.example.com) plus the payload, typically formed of the header and/or the body. From FIGS. 4A-1 and 4A-2, the features extracted from the payload (circled in FIG. 4A-2) include the terms SELECT, *, and FROM, and a created feature, may be SQLINJECTION.

The derived features are analyzed with respect to the Rules and Policies, from the Rules & Policies module 213, for suspicious features, at block 306. If there are not any suspicious features, the process moves to block 308, where an indicator that the traffic is allowed to pass to its destination is configured, and accordingly, a recommendation is sent (issued) to the gateway 100, that the traffic is allowed (to pass to its intended destination, i.e., the web server hosting the web site SQL Injection Forum).

Should suspicious features be found at block 306, the process moves to block 310, where the suspicious feature(s) are tagged as suspicious. The suspicious features are stored in the temporary storage of the storage/memory 204.

The process moves to block 312, where it is determined whether all of the tagged suspicious features derived from the data, are whitelisted. This determination is made by performing a look up of suspicious features in the White List of the data storage 215d.

Should it be found at block 312 that the derived or otherwise obtained (and tagged) suspicious feature/features are whitelisted, the process moves to block 314. At block 314, the WAAP engine 101 indicates allowability (for the data, and hence, the traffic to pass to its intended destination, e.g., associated with the normalized data), and sends a recommendation to the gateway 100, that this data (associated with the traffic) is allowable (and may be passed by the gateway 100 to the server 102 hosting the web site).

Should the tagged suspicious features not be whitelisted, at block 312, the process moves to block 316, where it is determined whether the data associated with the traffic is from a trusted source, the determination of a "trusted source" based on predefined trusted sources, as determined by the system administrator 103, or Rules and/or Policies of the system 101' (the WAAP Server 101). The trusted sources are stored, for example, in the data storage 215 at location 215a.

If no, at block 316, the traffic is not from a trusted source, and the process moves to block 318. At block 318, the WAAP engine 101 indicates that the data associated with the traffic, and hence, the traffic, in not allowable (for passage to its intended destination, e.g., associated with the normalized data), and, for example, sends a recommendation to the gateway 100, that the traffic should not be allowed. The gateway 100, for example, based on this recommendation, may block the traffic, so that it does not reach the web site 102 (the intended destination).

Returning to block 316, should the data associated with the traffic (and accordingly, the traffic) be from a trusted source, the normalized data, derived features, and trusted sources are entered into and stored in data storage 215 at a location 215e, at block 320.

The process moves to block 322, where it is determined whether there are enough trusted sources, for example, a predetermined number or threshold number for all suspicious features and the normalized data. Also, for example, the number of trusted sources for each suspicious feature is in accordance with a policy, for example, as set by the system administrator 103a for the WAAP engine 101.

For example, at block 322, if the predetermined number or threshold number of trusted sources is not met for all suspicious features, the process moves to block 323. At block 323, the suspicious features which meet the threshold are whitelisted, and accordingly, the white list in the data storage 215d is updated with the normalized data and corresponding feature(s) that met the predetermined number or threshold number of trusted sources.

The process then moves to block 324, where the WAAP engine 101 provides an indicator that the data associated with the traffic, and hence, the traffic, is subject to an administrator decision of how the traffic is to be processed (handled). The WAAP engine 101 transmits such a recommendation for an administrator decision, to the gateway 100.

Alternately, at block 322, should the predetermined number of trusted sources be met for all suspicious features, for example, the normalized data and all of the corresponding feature(s), from the data associated with the traffic, are whitelisted, at block 326. Also, for example, at block 326, the white list in data storage 215d is updated with the normalized data and corresponding feature(s).

From block 326, the process moves to block 328. Here, the WAAP engine 101 indicates that the data associated with the traffic, and hence, the traffic is allowable, and issues and sends a recommendation, that the traffic is allowable.

Examples of the processes of blocks 300-328 are now described with reference to the screen diagrams of FIGS. 1, 4A-1, 4A-2, 4B, 4C and 4D in two scenarios, Scenario 1 and Scenario 2.

Scenario 1

In Scenario 1, the FEATURES 215b and SUSPICIOUS FEATURES 215c are configured for deriving or otherwise obtaining features, which are extracted features. Accordingly, attention is directed to FIGS. 1, 2A, 2B-1, 2B-2, 2B-3, 3 4A-1, 4A-2, 4B, 4C and 4D.

Traffic data including data associated with an HTTP request from User1 (FIGS. 4A-1 and 4A-2), based on User1 being logged into the web site SQLinjection.example.com 102, is passed from the gateway 100 to the WAAP engine 101, at block 300. Additionally, User1 (User1@example.com) is a trusted source (alternately, the computer 52a of user1 or the computer 52a of user1 subject to certain restrictions may also be a trusted source, as well as any other trusted source, as designated by the system administrator 103a). The traffic, e.g., a post in an HTTP request arrives at the gateway 100, from the source, User1, over the network 50 at a first time T1, Feb. 1, 2019. The URL of the HTTP request is:

http://SQLInjection.example.com/01022019/post-comment/index.html?user_id=user1,

The gateway 100 sends data associated with the traffic including data representative of the HTTP request, to the WAAP engine 101, which at block 302, normalizes this data to, or alternately, receives this normalized data, as:

http://SQLInjection.example.com/post-comment/index.html?user_id.

The process moves past block 304 where features are derived, or otherwise obtained, by extraction, from the data, in accordance with the configurations of FEATURES and SUSPECTED FEATURES (data storages 215b, 215c), of the post, "Look at my DB injection CODE: SELECT*FROM USERS", in FIG. 4A-1, with the extracted suspicious features, from block 306, being, SELECT, *, FROM (as circled in FIG. 4A-2). These suspicious features are tagged, at block 310.

The process then moves to block 312, where the features SELECT, *, FROM have not been whitelisted. Accordingly, the process moves to block 316, where the source associated with the traffic data including the normalized data and derived features is a trusted source, User1. The extracted suspicious features, are stored in data storage 215e at block 320, as shown in FIG. 2B-1. At this time T1, the whitelist of data storage 215d has not been populated.

The process moves to block 322, where there is now one trusted source, User1, but this is below the threshold of two trusted sources (FIG. 2B-1) for all suspicious features, for example, as set by the rules and policies of module 213. Accordingly, the process moves to block 323, where no action is taken, since the threshold (e.g., the number 2 for two trusted sources for the suspicious feature(s)) was not met.

From block 323, the process moves to block 324, where the WAAP engine 101 provides an indication that the traffic data, and hence, the traffic, is subject to an administrator decision. The WAAP engine 101 sends the gateway 100 an administrator decision recommendation for this traffic, to pass to its intended destination, e.g., the web site of the web server 102.

Next, traffic data including data associated with an HTTP request from User2 (FIG. 4B), based on User2 being logged into the web site SQLinjection.example.com (of web server 102), is passed from the gateway 100 to the WAAP engine 101, at block 300. Additionally, User2 (User2@example.net) is a trusted source (alternately, the computer 52b of User2 or the computer 52b of User2 subject to certain restrictions may also be a trusted source, as well an any other trusted source, as designated by the system administrator 103a). The traffic, e.g., post in an HTTP request arrives at the gateway 100, from the source, User2, over the network 50 at a second time T2 (subsequent to time T1), on Feb. 2, 2019. The URL of the HTTP request is:
http://SQLInjection.example.com/02022019/post-comment/index.html?user_id=user2, The gateway 100 sends data associated with the traffic including data representative of the HTTP request, to the WAAP engine 101, which at block 302, normalizes this data to, or alternately, receives this normalized data, as:
http://SQLInjection.example.com/post-comment/index.html?user_id.

At block 304, the features are derived, or otherwise obtained, by extraction, and include, SELECT, *, FROM, WHERE. The process moves past block 306, where the aforementioned derived features are found to be suspicious, and these suspicious features are tagged, at block 310. The process moves to block 312, where all of the derived features, SELECT, *, FROM, WHERE, have not been whitelisted, as per the whitelist 215d of FIG. 2B-1, so the process moves to block 316.

At block 316, the source associated with the traffic data including the normalized data and derived features is a trusted source, User2. The extracted suspicious features, are stored in data storage 215e at block 320, as shown in FIG. 2B-2, with this action occurring at time T2. At this time T2, the whitelist of data storage 215d has not been populated, as shown in FIG. 2B-2.

The process moves to block 322, where User2 becomes the second trusted source, along with User1, for certain features, SELECT, *, FROM, but not the feature WHERE, which was only derived from traffic data associated with User2. As there are now enough trusted sources for the normalized data and corresponding features, but not all of the derived features meet the threshold, e.g., only the derived features SELECT, *, FROM, at block 322, the process moves to block 323.

At block 323, which occurs at time T3, sometime, even instantaneously, after time T2, the suspicious features which met the threshold for the data are whitelisted. These suspicious features for whitelisting include, SELECT, *, FROM, and upon being moved to the whitelist 215d from Trusted Sources Requests 215e, these data storages 215d, 215e at time T3 are shown in FIG. 2B-3.

The process moves to block 324, where the WAAP engine 101 provides an indicator that the data associated with the traffic, and hence, the traffic, is subject to an administrator decision of how the traffic is to be processed (handled). The WAAP engine 101 transmits such a recommendation for an administrator decision, to the gateway 100.

The following Scenarios 1A and 1B are for data associated with the traffic from User3, which is processed by the system 101' at a fourth time T4 (subsequent to time T3), on Feb. 3, 2019.

Scenario 1A

Next, traffic data including data associated with an HTTP request from User3 (FIG. 4C), based on User3 being logged into the web site SQLinjection.example.com (of web server 102), is passed from the gateway 100 to the WAAP engine 101, at block 300. Additionally, User3 (User3@example.org) is a regular and untrusted source (as well as his computer 54). The traffic, e.g., a post in an HTTP request arrives at the gateway 100, from the source, User3, over the network 50 at a fourth time T4 (subsequent to time T3), on Feb. 3, 2019. The URL for the HTTP request is:
http://SQLInjection.example.com/03022019/post-comment/index.html?user_id=user3, The gateway 100 sends data associated with the traffic, including data representative of the HTTP request, to the WAAP engine 101, which at block 302, normalizes this data to, or alternately, receives this normalized data, as:
http://SQLInjection.example.com/post-comment/index.html?user_id.

At block 304, the features are derived, or otherwise obtained, by extraction, and include, SELECT, *, FROM. The process moves past block 306, where the aforementioned derived features were found to be suspicious, and these suspicious features are tagged, at block 310. The process moves to block 312, where the extracted suspicious features, SELECT, *, FROM, have been whitelisted, as per the whitelist 215d of FIG. 2B-3, so the process moves to block 314.

At block 314, the WAAP engine 101 indicates that the data associated with the traffic, and hence, the traffic is allowable. The WAAP engine 101 issues and sends a recommendation to the gateway 100, that the traffic is allowable.

Scenario 1B

Next, traffic data including data associated with an HTTP request from User3 (FIG. 4D), based on User3 being logged into the web site SQLinjection.example.com (of web server 102), is passed from the gateway 100 to the WAAP engine 101, at block 300. Additionally, User3 (User3@example.org) is a regular and untrusted source (as well as his computer 54). The traffic, e.g., a post in an HTTP request arrives at the gateway 100, from the source, User3, over the network 50 at a fourth time T4 (subsequent to time T3), on Feb. 3, 2019. The URL for the HTTP request is:

http://SQLInjection.example.com/03022019/post-comment/index.html?user_id=user3,

The gateway 100 sends data associated with the traffic, including data representative of the HTTP request, to the WAAP engine 101, which at block 302, normalizes this data to, or alternately, receives this normalized data, as:

http://SQLInjection.example.com/post-comment/index.html?user_id.

At block 304, the features are derived, or otherwise obtained, by extraction, and include, SELECT, *, FROM, WHERE. The process moves past block 306, where the aforementioned derived features were found to be suspicious, and these suspicious features are tagged, at block 310. The process moves to block 312, where the extracted suspicious feature, WHERE, has not been whitelisted, as per the whitelist 215d of FIG. 2B-3, so the process moves to block 316.

At block 316, User3 is not a trusted source. The process moves to block 318, where the WAAP engine 101 indicates the data associated with the traffic, and hence, the traffic, in not allowable (for passage to its intended destination). The WAAP engine 101, for example, sends a recommendation to the gateway 100, that the traffic should not be allowed. The gateway 100, for example, based on this recommendation, may block the traffic, so that it does not reach the web site SQLInjection.example.com hosted by the web server 102 (the intended destination).

Scenario 2

In Scenario 2, the FEATURES 215b and SUSPICIOUS FEATURES 215c are configured for deriving or otherwise obtaining features being created features. Accordingly, attention is directed to FIGS. 1, 2A, 2C-1, 2C-2, 2C-3, 3 4A-1, 4A-2, 4B, 4C and 4D.

Traffic data including data associated with an HTTP request from User1 (FIGS. 4A-1 and 4A-2), based on User1 being logged into the web site SQLinjection.example.com (of web server 102), is passed from the gateway 100 to the WAAP engine 101, at block 300. Additionally, User1 (User1@example.com) is a trusted source (alternately, the computer 52a of user1 or the computer 52a of user1 subject to certain restrictions may also be a trusted source, as well an any other trusted source, as designated by the system administrator 103a). The traffic, e.g., post in an HTTP request arrives at the gateway 100, from the source, User1, over the network 50 at a first time T1, Feb. 1, 2019. The URL of the HTTP request is:

http://SQLInjection.example.com/01022019/post-comment/index.html?user_id=user1,

The gateway 100 sends data associated with the traffic, including data representative of the HTTP request, to the WAAP engine 101, which at block 302, normalizes this data to, or alternately, receives this normalized data, as:

http://SQLInjection.example.com/post-comment/index.html?user_id.

The process moves past block 304 where features are derived, or otherwise obtained, by creation, from the data, in accordance with the configurations of FEATURES and SUSPECTED FEATURES (data storages 215b, 215c), of the post, "Look at my DB injection CODE: SELECT*FROM USERS", in FIG. 4A-1. The derived features from this post, based on the keywords or terms, "CODE: SELECT*FROM USERS", found to be suspicious at block 306, is the created feature (suspicious feature) SQLINJECTION. This suspicious feature is tagged, at block 310.

The process then moves to block 312, where the feature SQLINJECTION has not been whitelisted, as shown for time T1 in FIG. 2C-1. Accordingly, the process moves to block 316, where the source associated with the traffic data including the normalized data and derived features is a trusted source, User1. The derived suspicious feature, is stored in data storage 215e at block 320, as shown in FIG. 2C-1. At this time T1, the whitelist of data storage 215d has not been populated.

The process moves to block 322, where there is now one trusted source, User1, but this is below the threshold of two trusted sources for all suspicious features. Accordingly, the process moves to block 323, where no action is taken where no action is taken, since the threshold (e.g., the number 2 for two trusted sources for the suspicious feature(s)) was not met.

From block 323, the process moves to block 324, where the WAAP engine 101 provides an indication that the traffic data, and hence, the traffic is subject to an administrator decision, and sends the gateway 100 an administrator decision recommendation for this traffic, to pass to its intended destination, e.g., the web site of the web server 102.

Next, traffic data including data associated with an HTTP request from User2 (FIG. 4B), based on User2 being logged into the web site SQLinjection.example.com 102, is passed from the gateway 100 to the WAAP engine 101, at block 300. Additionally, User2 (User2@example.net) is a trusted source (alternately, the computer 52b of User2 or the computer 52b of User2 subject to certain restrictions may also be a trusted source, as well an any other trusted source, as designated by the system administrator 103a). The traffic, e.g., post in an HTTP request arrives at the gateway 100, from the source, User2, over the network 50 at a second time T2 (subsequent to time T1), on Feb. 2, 2019. The URL of the HTTP request is:

http://SQLInjection.example.com/02022019/post-comment/index.html?user_id=user2,

The gateway 100 sends data associated with the traffic, including data representative of the HTTP request, to the WAAP engine 101, which at block 302, normalizes this data to, or alternately, receives this normalized data, as:

http://SQLInjection.example.com/post-comment/index.html?user_id.

At block 304, the features are derived, or otherwise obtained, by creation, from the post, "This may work better CODE: SELECT*FROM USERS WHERE X="1"", yields the created feature SQLINJECTION, in accordance with rules and policies upon the post being read by the system 101'. This suspicious feature is tagged, at block 310.

The process moves past block 306, where the aforementioned derived feature was found to be suspicious, and this suspicious feature was tagged, at block 310. The process moves to block 312, where all of its extracted features, here SQLINJECTION, not been whitelisted, as per the whitelist 215d of FIG. 2C-1, so the process moves to block 316.

At block 316, the source associated with the traffic data including the normalized data and derived features is a trusted source, User2. The created suspicious feature(s), i.e., SQLINJECTION, is, stored in data storage 215e at block 320, as shown in FIG. 2C-2, with this action occurring at time T2. At this time T2, the whitelist of data storage 215d has not been populated, as shown in FIG. 2C-2.

The process moves to block 322, where User2 becomes the second trusted source, along with User1, for all suspicious features, here, all features is the feature SQLINJECTION, as derived from traffic data associated with User2. As there are now enough trusted sources for the normalized data and corresponding features, SQLINJECTION, at block 322, the process moves to block 326.

At block 326, which occurs at time T3, sometime, even instantaneously, after time T2, the suspicious features for the data are whitelisted. Here, there is a single suspicious feature for whitelisting, SQLINJECTION, and upon being moved to the whitelist 215d from Trusted Sources Requests 215e, these data storages 215d, 215e at time T3 are shown in FIG. 2C-3.

The process moves to block 328, where the WAAP engine 101 indicates that the data associated with the traffic, and hence, the traffic is allowable. The WAAP engine issues and sends a recommendation to the gateway 100, that the traffic is allowable.

Next, traffic data including data associated with an HTTP request from User3 (FIG. 4D), based on User3 being logged into the web site SQLinjection.example.com 102, is passed from the gateway 100 to the WAAP engine 101, at block 300. Additionally, User3 (User3@example.org) is a regular and untrusted source (as well as his computer 54). The traffic, e.g., post in an HTTP request arrives at the gateway 100, from the source, User3, over the network 50 at a fourth time T4 (subsequent to time T3), on Feb. 3, 2019. The URL of the HTTP request is:

http://SQLInjection.example.com/03022019/post-comment/index.html?user_id=user3,

The gateway 100 sends data associated with the traffic including data representative of the HTTP request, to the WAAP engine 101, which at block 302, normalizes this data to, or alternately, receives this normalized data, as:

http://SQLInjection.example.com/post-comment/index.html?user_id.

At block 304, the features are derived, or otherwise obtained, by creation, from the post, "How about this CODE: SELECT*FROM USERS WHERE X="1"". This yields the created feature SQLINJECTION, in accordance with rules and policies upon the post being read by the system 101'. This suspicious feature is tagged, at block 310.

The process moves to block 312, where the created suspicious feature/features, SQLINJECTION, has been whitelisted, as per the whitelist 215d of FIG. 2C-3, so the process moves to block 314.

At block 314, the WAAP engine 101 indicates that the data associated with the traffic, and hence, the traffic is allowable, and issues and sends a recommendation to the gateway 100, that the traffic is allowable.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, non-transitory storage media such as a magnetic hard-disk and/or removable media, for storing instructions and/or data. Optionally, a network connection is provided as well. A display and/or a user input device such as a keyboard or mouse are optionally provided as well.

For example, any combination of one or more non-transitory computer readable (storage) medium(s) may be utilized in accordance with the above-listed embodiments of the present invention. A non-transitory computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable non-transitory storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

As will be understood with reference to the paragraphs and the referenced drawings, provided above, various embodiments of computer-implemented methods are provided herein, some of which can be performed by various embodiments of apparatuses and systems described herein and some of which can be performed according to instructions stored in non-transitory computer-readable storage media described herein. Still, some embodiments of computer-implemented methods provided herein can be performed by other apparatuses or systems and can be performed according to instructions stored in computer-readable storage media other than that described herein, as will become apparent to those having skill in the art with reference to the embodiments described herein. Any reference to systems and computer-readable storage media with respect to the following computer-implemented methods is provided for explanatory purposes, and is not intended to limit any of such systems and any of such non-transitory computer-readable storage media with regard to embodiments of computer-implemented methods described above. Likewise, any reference to the following computer-implemented methods with respect to systems and computer-readable storage media is provided for explanatory purposes, and is not intended to limit any of such computer-implemented methods disclosed herein.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As used herein, the singular form "a", "an" and "the" include plural references unless the context clearly dictates otherwise.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

The above-described processes including portions thereof can be performed by software, hardware and combinations thereof. These processes and portions thereof can be performed by computers, computer-type devices, workstations, processors, micro-processors, other electronic searching tools and memory and other non-transitory storage-type devices associated therewith. The processes and portions thereof can also be embodied in programmable non-transitory storage media, for example, compact discs (CDs) or other discs including magnetic, optical, etc., readable by a machine or the like, or other computer usable storage media, including magnetic, optical, or semiconductor storage, or other source of electronic signals.

The processes (methods) and systems, including components thereof, herein have been described with exemplary reference to specific hardware and software. The processes (methods) have been described as exemplary, whereby specific steps and their order can be omitted and/or changed by persons of ordinary skill in the art to reduce these embodiments to practice without undue experimentation. The processes (methods) and systems have been described in a manner sufficient to enable persons of ordinary skill in the art to readily adapt other hardware and software as may be needed to reduce any of the embodiments to practice without undue experimentation and using conventional techniques.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The invention claimed is:

1. A method for analyzing electronic and/or data traffic comprising:
   obtaining at least one feature from normalized data associated with the traffic;
   determining whether the at least one feature has been whitelisted;
   determining whether the normalized data was from a trusted source;
   if the at least one feature was not included on a white list, and the normalized data, from which the at least one feature was obtained, was from a trusted source:
      determining whether the at least one feature was obtained from a predetermined amount of trusted sources, and similar normalized data; and,
   if the predetermined number of trusted sources has been met: 1) updating the whitelist to include the features which have met the predetermined number of trusted sources, and 2) indicating that the traffic, including the features from a subsequent and similar normalized data, is allowed to pass to the destination associated with the normalized data.

2. The method of claim 1 wherein the at least one feature includes one or more features.

3. The method of claim 2, wherein the features are suspicious features in accordance with predetermined criteria.

4. The method of claim 3, wherein the predetermined criteria include rules and policies.

5. The method of claim 2, additionally comprising:
   responding to the indicating that the traffic, including the features from a subsequent and similar normalized data, is allowed to pass to the destination associated with the normalized data, by sending a message that the traffic is allowed to pass to the destination associated with the normalized data to a gateway.

6. The method of claim 5, wherein the gateway includes at least one of: a network gateway, a proxy, a client, a server associated with an intended destination for the traffic.

7. The method of claim 5, wherein the gateway includes at least one of: a network gateway or a proxy.

8. The method of claim 5 additionally comprising: normalizing data associated with the traffic to create the normalized data associated with the traffic.

9. The method of claim 1, wherein the predetermined number includes a threshold number.

10. The method of claim 1, wherein the similar normalized data includes identical normalized data.

11. The method of claim 1, wherein the normalized data includes at least one request.

12. The method of claim 11, wherein the at least one request includes an HTTP (Hypertext Transfer Protocol) request.

13. A computer system for analyzing electronic and/or data traffic comprising:
- a non-transitory storage medium for storing computer components; and,
- a computerized processor for executing the computer components comprising:
  - a module for obtaining at least one feature from normalized data associated with the traffic;
  - a module for determining whether the at least one feature has been whitelisted;
  - a module for determining whether the normalized data was from a trusted source;
  - a module for determining that if the at least one feature was not included on a white list, and the normalized data, from which the at least one feature was obtained, was from a trusted source, determining whether the at least one feature was obtained from a predetermined amount of trusted sources, and similar normalized data; and,
  - a module for determining that when the predetermined number of trusted sources has been met: 1) updating the whitelist to include the features which have met the predetermined number of trusted sources, and 2) indicating that the traffic, including the features from a subsequent and similar normalized data, is allowed to pass to the destination associated with the normalized data.

14. The computer system of claim 13, wherein the at least one feature includes one or more features.

15. The computer system of claim 14, additionally comprising a module for designating the one or more features as suspicious features.

16. The computer system of claim 13, additionally comprising:
- a module for responding to the indicating that the traffic, including the features from a subsequent and similar normalized data, is allowed to pass to the destination associated with the normalized data, by sending a message that the traffic is allowed to pass to the destination associated with the normalized data to a gateway.

17. The computer system of claim 16, additionally comprising a gateway including at least one of: a network gateway, a proxy, a client, a server associated with an intended destination for the traffic.

18. The computer system of claim 16, additionally comprising a gateway including at least one of: a network gateway or a proxy.

19. A computer usable non-transitory storage medium having a computer program embodied thereon for causing a suitably programmed system to analyze electronic and/or data traffic, by performing the following steps when such program is executed on the system, the steps comprising:
- obtaining at least one feature from normalized data associated with the traffic;
- determining whether the at least one feature has been whitelisted;
- determining whether the normalized data was from a trusted source;
- if the at least one feature was not included on a white list, and the normalized data, from which the at least one feature was obtained, was from a trusted source:
  - determining whether the at least one feature was obtained from a predetermined amount of trusted sources, and similar normalized data; and,
- if the predetermined number of trusted sources has been met: 1) updating the whitelist to include the features which have met the predetermined number of trusted sources, and 2) indicating that the traffic, including the features from a subsequent and similar normalized data, is allowed to pass to the destination associated with the normalized data.

20. The computer usable non-transitory storage medium of claim 19, wherein the at least one feature includes one or more features, and the one or more features include suspicious features in accordance with predetermined criteria including rules and policies.

* * * * *